US012132218B2

United States Patent
Sonawane et al.

(10) Patent No.: US 12,132,218 B2
(45) Date of Patent: Oct. 29, 2024

(54) STRUCTURAL MODULE

(71) Applicant: Rivian IP Holdings, LLC, Plymouth, MI (US)

(72) Inventors: Atul Arun Sonawane, Irvine, CA (US); Piyush Khater, Mission Viejo, CA (US); Adam Ballard, Corona, CA (US); Sharbel elKantati, Leamington (CA)

(73) Assignee: Rivian IP Holdings, LLC, Irvine, CA (US)

(*) Notice: Subject to any disclaimer, the term of this patent is extended or adjusted under 35 U.S.C. 154(b) by 8 days.

(21) Appl. No.: 18/177,347

(22) Filed: Mar. 2, 2023

(65) Prior Publication Data

US 2024/0222773 A1 Jul. 4, 2024

Related U.S. Application Data

(60) Provisional application No. 63/477,603, filed on Dec. 29, 2022.

(51) Int. Cl.
*H01M 50/249* (2021.01)
*B60R 16/04* (2006.01)
*H01M 50/244* (2021.01)
*B60K 1/04* (2019.01)

(52) U.S. Cl.
CPC ........... *H01M 50/249* (2021.01); *B60R 16/04* (2013.01); *H01M 50/244* (2021.01); *B60K 1/04* (2013.01); *H01M 2220/20* (2013.01)

(58) Field of Classification Search
CPC ............ H01M 50/249; H01M 50/244; H01M 50/289; H01M 50/297; B60K 1/04
See application file for complete search history.

(56) References Cited

U.S. PATENT DOCUMENTS

| 4,129,194 | A | * | 12/1978 | Hammond | .......... | H01M 50/204 |
| | | | | | | 180/68.5 |
| 5,040,627 | A | * | 8/1991 | Swayze | .................... | B60K 1/04 |
| | | | | | | 180/68.5 |
| 5,558,956 | A | * | 9/1996 | Gujer | .................. | H01M 50/271 |
| | | | | | | 429/100 |
| 10,615,385 | B2 | * | 4/2020 | Takahashi | .......... | H01M 50/249 |
| 11,251,486 | B2 | * | 2/2022 | Popovski | ............ | H01M 50/264 |
| 11,563,246 | B2 | * | 1/2023 | Jeon | .................... | H01M 10/653 |
| 11,742,511 | B2 | * | 8/2023 | Ogino | ................. | H01M 10/482 |
| | | | | | | 429/158 |

(Continued)

FOREIGN PATENT DOCUMENTS

| CN | 114552110 | A | * | 5/2022 |
| JP | 2017196958 | A | * | 11/2017 |

(Continued)

OTHER PUBLICATIONS

Translation of CN-114552110-A (Year: 2022).*
Translation of WO-2020111042-A1 (Year: 2020).*

*Primary Examiner* — Katy M Ebner
(74) *Attorney, Agent, or Firm* — Foley & Lardner LLP

(57) ABSTRACT

An apparatus can include an energy storage device. The apparatus can include a wall coupled with the energy storage device. The apparatus can include a cover coupled with the wall. The apparatus can include a plate coupled with the wall. The energy storage device can be enclosed at least partially within the cover and the plate.

15 Claims, 11 Drawing Sheets

(56) References Cited

U.S. PATENT DOCUMENTS

| | | | | |
|---|---|---|---|---|
| 11,752,852 B2* | 9/2023 | Kellner | H01M 10/625 | 180/68.5 |
| 2002/0093246 A1* | 7/2002 | Takahashi | H01M 50/209 | 903/952 |
| 2011/0008659 A1* | 1/2011 | Okada | H01M 10/425 | 429/90 |
| 2011/0159336 A1* | 6/2011 | Ohkura | H01M 50/20 | 429/99 |
| 2016/0190526 A1* | 6/2016 | Yamada | H01M 50/264 | 180/68.5 |
| 2016/0285142 A1* | 9/2016 | Kimura | H01M 10/657 | |
| 2018/0269443 A1* | 9/2018 | Takahashi | H01M 50/262 | |
| 2020/0058912 A1* | 2/2020 | Kuramitsu | H01G 11/10 | |
| 2020/0411922 A1* | 12/2020 | Kuramitsu | H01M 10/659 | |
| 2021/0218000 A1* | 7/2021 | Mcmanaman | H01M 50/209 | |
| 2021/0226274 A1* | 7/2021 | Negrete | H01M 50/20 | |
| 2021/0249731 A1* | 8/2021 | You | H01M 50/3425 | |
| 2021/0268886 A1* | 9/2021 | Nakamura | H01M 50/289 | |
| 2022/0006150 A1* | 1/2022 | Foran | H01M 50/231 | |
| 2022/0006151 A1* | 1/2022 | Foran | B60K 1/04 | |
| 2022/0013841 A1* | 1/2022 | Greber | H01M 10/6557 | |
| 2022/0077489 A1* | 3/2022 | Erb | H01M 10/613 | |
| 2022/0181740 A1* | 6/2022 | Yamashiro | H01M 50/249 | |
| 2022/0266701 A1* | 8/2022 | Collins | H01M 50/262 | |
| 2022/0285755 A1* | 9/2022 | Chi | H01M 10/647 | |
| 2022/0294058 A1* | 9/2022 | Brandley | H01M 50/231 | |
| 2022/0320659 A1* | 10/2022 | Munjurulimana | H01M 50/249 | |
| 2022/0367956 A1* | 11/2022 | Pan | H01M 50/289 | |
| 2023/0021263 A1* | 1/2023 | Iwashima | H01G 11/08 | |
| 2023/0028267 A1* | 1/2023 | Kimura | H01M 10/425 | |
| 2023/0046419 A1* | 2/2023 | Chun | H01M 50/289 | |
| 2023/0071238 A1* | 3/2023 | Hwang | H01M 10/425 | |
| 2023/0104528 A1* | 4/2023 | Hantschel | H01M 10/653 | 429/99 |
| 2023/0106602 A1* | 4/2023 | Wang | H01M 50/249 | 429/100 |
| 2023/0123420 A1* | 4/2023 | Pucher | H01M 50/264 | 429/163 |
| 2023/0137044 A1* | 5/2023 | Boddakayala | H01M 50/233 | 429/159 |
| 2023/0231290 A1* | 7/2023 | Rhee | H01M 50/522 | 429/7 |
| 2023/0238634 A1* | 7/2023 | Shin | H01M 50/244 | 429/100 |
| 2023/0238656 A1* | 7/2023 | Takada | H01M 50/48 | 429/163 |
| 2023/0256803 A1* | 8/2023 | Arai | B60K 1/04 | 180/68.5 |
| 2023/0261300 A1* | 8/2023 | Compton | H01M 50/271 | 429/56 |
| 2023/0268599 A1* | 8/2023 | Ju | H01M 10/647 | 429/156 |
| 2023/0275317 A1* | 8/2023 | Shimizu | H01M 50/394 | 429/82 |
| 2023/0282931 A1* | 9/2023 | Lee | H01M 50/211 | 429/82 |
| 2023/0291062 A1* | 9/2023 | Zhang | H01M 50/103 | 429/159 |
| 2023/0291079 A1* | 9/2023 | Yoo | H01M 10/613 | 429/159 |
| 2023/0307770 A1* | 9/2023 | Chang | H01M 50/264 | 429/163 |
| 2023/0307805 A1* | 9/2023 | Maguire | H01M 50/591 | 429/99 |
| 2023/0327266 A1* | 10/2023 | Wang | H01M 10/6556 | 429/99 |

FOREIGN PATENT DOCUMENTS

| | | | | |
|---|---|---|---|---|
| WO | WO-2020111042 A1 * | 6/2020 | | H01M 10/613 |
| WO | WO-2023122489 A1 * | 6/2023 | | |

\* cited by examiner

STRUCTURAL MODULE

CROSS-REFERENCE TO RELATED PATENT APPLICATIONS

This application claims the benefit of priority under 35 U.S.C. § 119 to U.S. Provisional Application No. 63/477,603, filed Dec. 29, 2022, which is incorporated herein by reference in its entirety.

INTRODUCTION

Battery packs can be used to provide power to electric vehicles.

SUMMARY

Battery packs can occupy large amounts of space in electric vehicles, and the size of the battery packs can be dictated by the size and quantity of structural members disposed within the battery pack. The technical solution described herein can eliminate longitudinal or lateral structural members inside the battery pack by using shear walls that are coupled with energy storage devices (e.g., battery modules) disposed in the battery pack to provide torsional and bending stiffness to the battery pack. The shear walls can be coupled within the battery pack via an adhesive, and the energy storage devices can be coupled with the shear walls via an adhesive to reduce the number of bolts used to assembly the battery pack.

At least one aspect is directed to an apparatus. The apparatus can include an energy storage device. The apparatus can include a wall coupled with the energy storage device. The apparatus can include a cover coupled with the wall. The apparatus can include a plate coupled with the wall. The energy storage device can be enclosed at least partially within the cover and the plate.

At least one aspect is directed to a method. The method can include coupling an energy storage device with a wall. The energy storage device can be disposed in a cavity. The method can include coupling a plate with the wall. The method can include coupling a cover with the wall. The plate and the cover can define the cavity.

At least one aspect is directed to an electric vehicle. The electric vehicle can include a battery pack. The battery pack can include an energy storage device. The battery pack can include a first wall coupled with the energy storage device. The battery pack can include a second wall disposed adjacent to and spaced apart from the first wall. The battery pack can include a bracket extending between the first wall and the second wall to couple the first wall with the second wall. The bracket can be coupled with the first wall via a first mechanical fastener. The bracket can be coupled with the second wall via a second mechanical fastener. The battery pack can include a cover coupled with the first wall and the second wall via the bracket. The cover can be coupled with the bracket via a third mechanical fastener. The battery pack can include a plate coupled with the first wall and the second wall. The plate and the cover can define a cavity. The energy storage device can be disposed in the cavity.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems for providing structural support to a battery pack. The various concepts introduced above and discussed in greater detail below may be implemented in any of numerous ways.

This disclosure is generally directed to systems and methods of providing structural support to a battery pack via an energy storage system/device (e.g., a battery cell, a plurality of battery cells, a battery module). The disclosed solution has a technical advantage of using components of the energy storage system/device to provide the necessary structure to maintain a shape, structural stability of a battery pack, and protect the energy storage systems/devices disposed in the battery pack. Using components of the energy storage system/device with structural benefits can reduce the number of additional structural elements of a battery pack. Fewer structural elements can lead to smaller and lighter battery packs and reduce manufacturing and installation costs and time. Lighter battery packs can reduce the overall weight of a vehicle, which can increase travel ranges of the vehicle before having to recharge.

The disclosed solution can include a battery pack. The battery pack can have at least one energy storage system/device (e.g., a battery cell, a plurality of battery cells, a battery module). For example, a first energy storage system/device can be coupled with a first wall and a second energy storage device can be coupled with a second wall. The walls can have a top flange and a bottom flange. The first wall can be coupled with the second wall. For example, a bracket can extend between the top flange of the first wall and the top flange of the second wall. The bracket can be bolted (or otherwise coupled) to both top flanges. The first wall and the second wall can be integral with each other. For example, the first wall and the second wall can define a single structure.

The battery pack can include a plate. The bottom flanges of the walls can couple with the plate. For example, the bottom flanges can be adhered to the plate. The battery pack can have a cover. The top flanges of the wall can couple with the cover. For example, with the two walls coupled together via a bracket, the cover can be bolted (or otherwise coupled) to the bracket. With the two wall integral with each other, the cover can be coupled with the top flanges of the walls.

Figure 1:
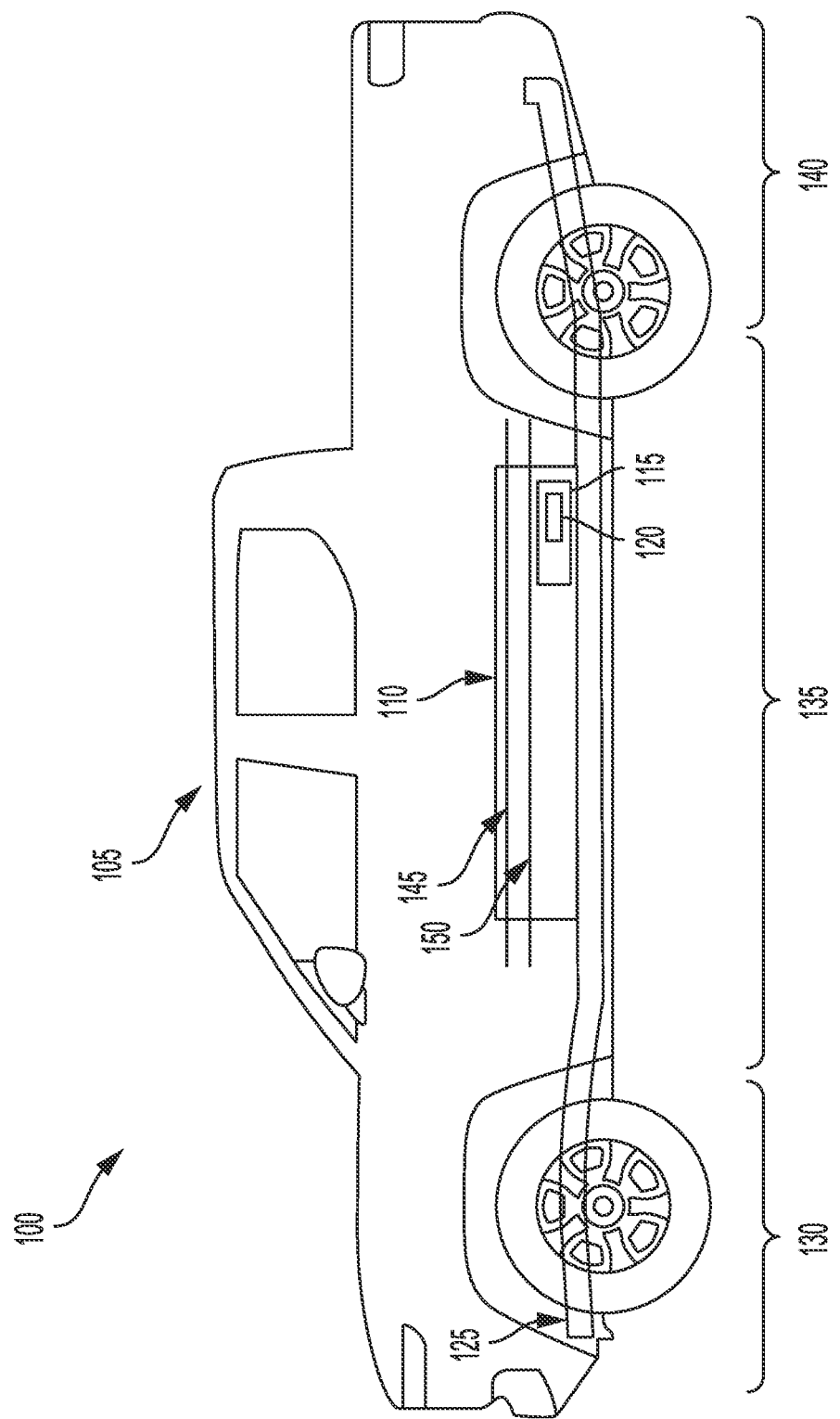
FIG. 1 depicts a cross-sectional view of an example electric vehicle, in accordance with some aspects.

FIG. 1 depicts an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, batteries 115 or battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery 115, the battery modules 115, or the battery cells 120 with other electrical components of the electric vehicle 105 to provide electrical power to various systems or components of the electric vehicle 105.

Figure 2A:
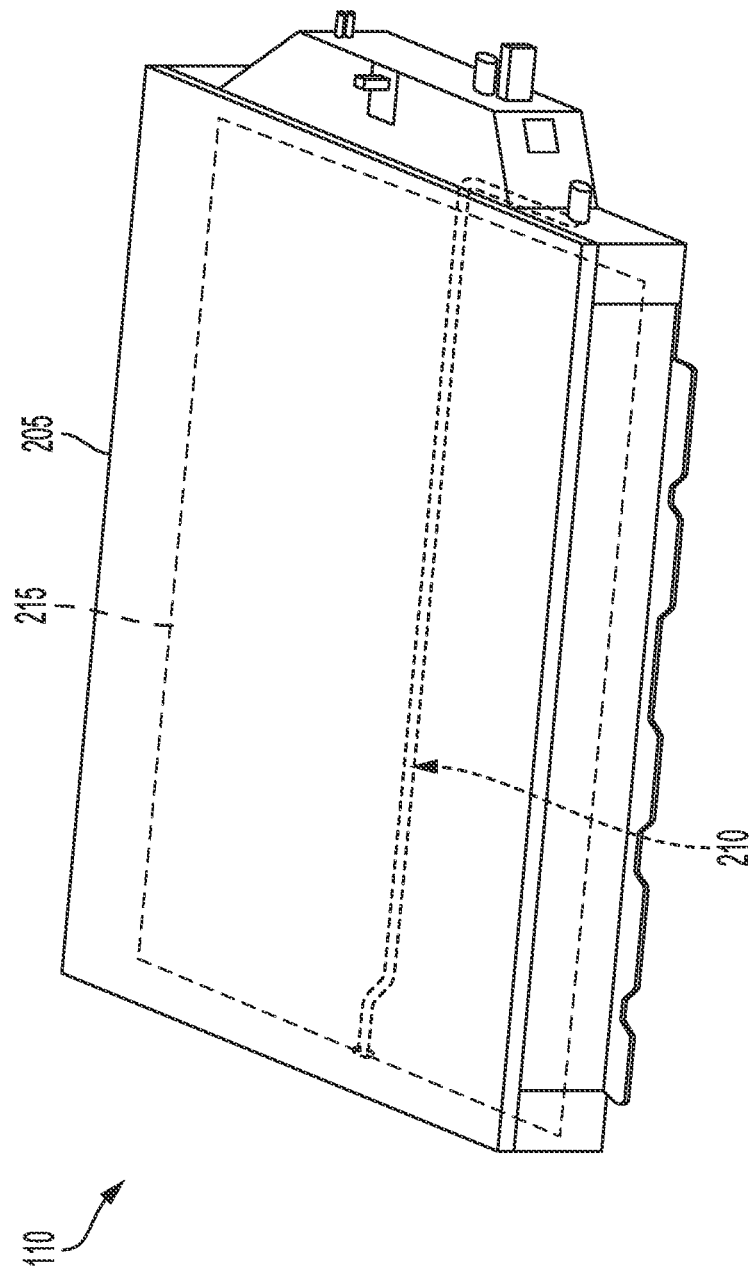
FIG. 2A depicts a perspective view of an example battery pack, in accordance with some aspects.

FIG. 2A depicts an example battery pack 110. Referring to FIG. 2A, among others, the battery pack 110 can provide power to electric vehicle 105. Battery packs 110 can include any arrangement or network of electrical, electronic, mechanical or electromechanical devices to power a vehicle of any type, such as the electric vehicle 105. The battery pack 110 can include at least one housing 205. The housing 205 can include at least one battery module 115 or at least one battery cell 120, as well as other battery pack components. The battery module 115 can be or can include one or more groups of prismatic cells, cylindrical cells, pouch cells, or other form factors of battery cells 120. The housing 205 can include a shield on the bottom or underneath the battery module 115 to protect the battery module 115 and/or cells 120 from external conditions, for example if the electric vehicle 105 is driven over rough terrains (e.g., off-road, trenches, rocks, etc.) The battery pack 110 can include at least one cooling line 210 that can distribute fluid through the battery pack 110 as part of a thermal/temperature control or heat exchange system that can also include at least one thermal component (e.g., cold plate) 215. The thermal component 215 can be positioned in relation to a top submodule and a bottom submodule, such as in between the top and bottom submodules, among other possibilities. The battery pack 110 can include any number of thermal components 215. For example, there can be one or more thermal components 215 per battery pack 110, or per battery module 115. At least one cooling line 210 can be coupled with, part of, or independent from the thermal component 215.

Figure 2B:
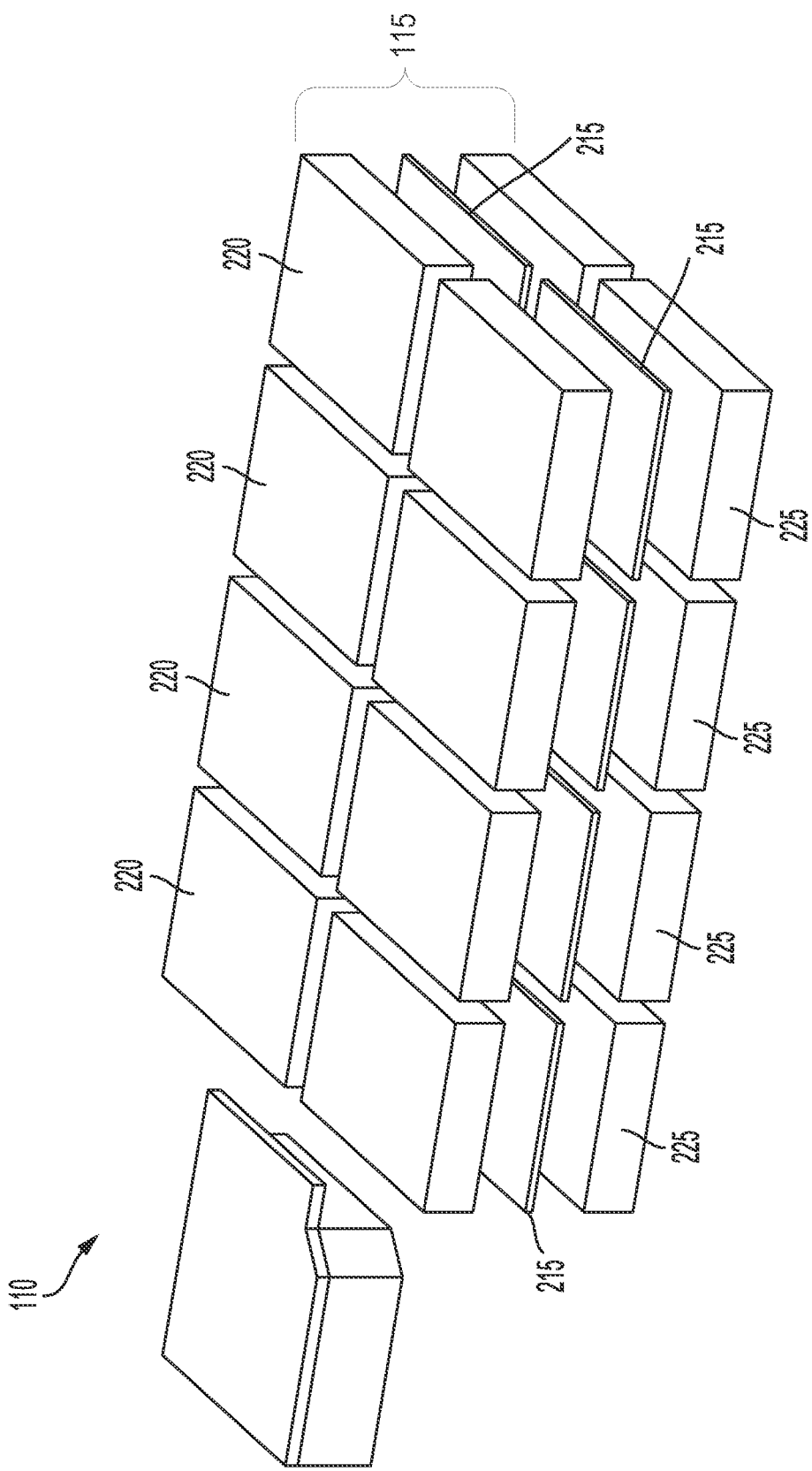
FIG. 2B depicts an exploded view of an example battery pack, in accordance with some aspects.

FIG. 2B depicts example battery modules 115. The battery modules 115 can include at least one submodule. For example, the battery modules 115 can include at least one first (e.g., top) submodule 220 or at least one second (e.g., bottom) submodule 225. At least one thermal component 215 can be disposed between the top submodule 220 and the bottom submodule 225. For example, one thermal component 215 can be configured for heat exchange with one battery module 115. The thermal component 215 can be disposed or thermally coupled between the top submodule 220 and the bottom submodule 225. One thermal component 215 can also be thermally coupled with more than one battery module 115 (or more than two submodules 220, 225). The thermal components 215 shown adjacent to each other can be combined into a single thermal component 215 that spans the size of one or more submodules 220 or 225. The thermal component 215 can be positioned underneath submodule 220 and over submodule 225, in between submodules 220 and 225, on one or more sides of submodules 220, 225, among other possibilities. The thermal component 215 can be disposed in sidewalls, cross members, structural beams, among various other components of the battery pack, such as battery pack 110 described above. The battery submodules 220, 225 can collectively form one battery module 115. In some examples each submodule 220, 225 can be considered as a complete battery module 115, rather than a submodule.

The battery modules 115 can each include a plurality of battery cells 120. The battery modules 115 can be disposed within the housing 205 of the battery pack 110. The battery modules 115 can include battery cells 120 that are cylindrical cells or prismatic cells, for example. The battery module 115 can operate as a modular unit of battery cells 120. For example, a battery module 115 can collect current or electrical power from the battery cells 120 that are included in the battery module 115 and can provide the current or electrical power as output from the battery pack 110. The battery pack 110 can include any number of battery modules 115. For example, the battery pack can have one, two, three, four, five, six, seven, eight, nine, ten, eleven, twelve or other number of battery modules 115 disposed in the housing 205. It should also be noted that each battery module 115 may include a top submodule 220 and a bottom submodule 225, possibly with a thermal component 215 in between the top submodule 220 and the bottom submodule 225. The battery pack 110 can include or define a plurality of areas for positioning of the battery module 115 and/or cells 120. The battery modules 115 can be square, rectangular, circular, triangular, symmetrical, or asymmetrical. In some examples, battery modules 115 may be different shapes, such that some battery modules 115 are rectangular but other battery modules 115 are square shaped, among other possibilities. The battery module 115 can include or define a plurality of slots, holders, or containers for a plurality of battery cells 120. It should be noted the illustrations and descriptions herein are provided for example purposes and should not be interpreted as limiting. For example, a battery module 115 can extend a full length of the battery pack 110. The battery cells 120 can be inserted in the battery pack 110 without battery modules 220 and 225. The battery cells 120 can be disposed in the battery pack 110 in a cell-to-pack configuration without modules 220 and 225, among other possibilities. The battery cells 120 can have a variety of form factors, shapes, or sizes. For example, battery cells 120 can have a cylindrical, rectangular, square, cubic, flat, pouch, elongated or prismatic form factor.

Figure 3:
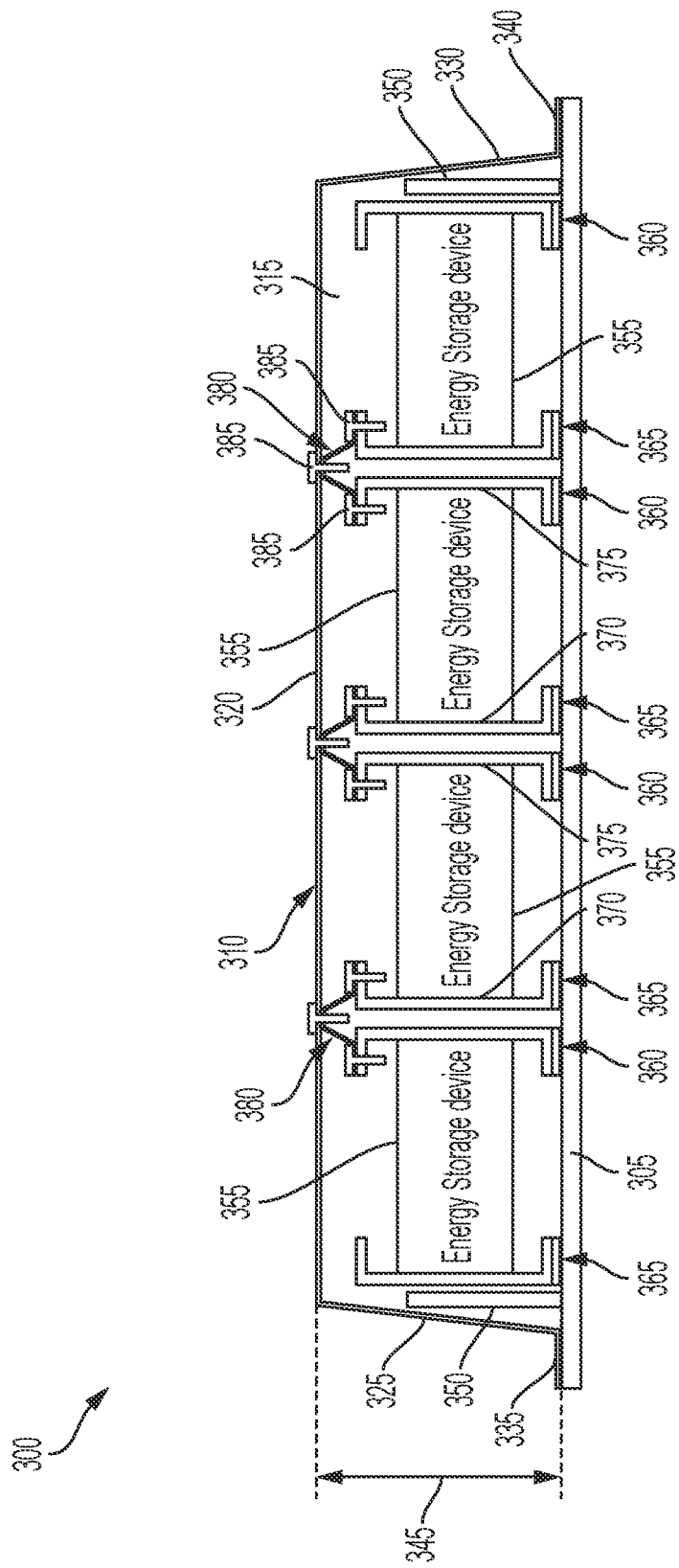
FIG. 3 depicts a front cross-sectional view of an example battery pack, in accordance with some aspects.

FIG. 3 depicts an example apparatus, shown as battery pack 300. The battery pack 300 can be, be a part of, or include battery pack 110 of the electric vehicle 105. The battery pack 300 can include at least one plate 305. The plate 305 can have a flat shape. The plate 305 can be a support structure for the battery pack 300. For example, the plate 305 can be an external surface of the battery pack 300. The plate 305 can be a bottom wall (e.g., a floor) of the battery pack 300. The plate 305 can support other components that are disposed in the battery pack 300.

The battery pack 300 can include at least one cover 310. The cover 310 and the plate 305 can define a cavity 315. For example, at least a portion of the cover 310 can be disposed away from the plate 305 leaving a space between the cover 310 and the plate 305. The space can be the cavity 315. The cover 310 can have a first surface, shown as lid 320. The lid 320 can be disposed away from and opposite of the plate 305. The cover 310 can have a second surface, shown as first sidewall 325, and a third surface, shown as second sidewall 330. The first sidewall 325 can be opposite the second sidewall 330. The first sidewall 325 and the second sidewall 330 can extend from the lid 320 toward the plate 305.

The cover 310 can have a first projection 335 extending from the first sidewall 325 and a second projection 340 extending from the second sidewall 330. The projections 335, 340 can extend outward (e.g., away from the cavity 315) from the sidewalls 325, 330. The projections 335, 340 can be substantially parallel (+/−10%) with the lid 320 or the cover 310. The cover 310 can couple with the plate 305 via the projections 335, 340. For example, the plate 305 can extend between the first projection 335 and the second projection 340. The first projection 335 and the second projection 340 can couple with the plate 305 via any coupling mechanism. For example, the projections 335, 340 can couple with the plate 305 via a mechanical fastener (e.g., a bolt, a clamp), an adhesive, welding, or any other coupling mechanism. The cover 310 can be removably coupled with the plate 305 such that components of the battery pack 300 can be inserted or removed from the cavity 315 at various times.

The cover 310 can have a height 345. The height 345 can be a distance between the plate 305 and the lid 320 of the cover 310. The height 345 can be based, at least partially, on the height of other components that are disposed in the cavity 315.

The battery pack 300 can include at least one structural member 350. The structural member 350 can be disposed adjacent to a sidewall 325, 330 of the cover 310. For example, a structural member 350 can extend along at least one of the first sidewall 325 and the second sidewall 330. The battery pack 300 can include a plurality of structural members 350. For example, a first structural member 350 can be disposed adjacent to the first sidewall 325 and a second structural member 350 can be disposed adjacent to the second sidewall 330. The structural members 350 can define a boundary within which other components of the battery pack 300 can be disposed.

Battery pack 300 can include at least one energy storage device 355. The energy storage device 355 can be any system or device capable of storing energy. For example, the energy storage device 355 can be a battery module 115, a battery submodule 220, 225, a battery cell 120, or a plurality of battery cells 120, among others. The battery pack 300 can include a plurality of energy storage devices 355. For example, the battery pack 300 can include a first energy storage device 355 and a second energy storage device 355. The first energy storage device 355 can be disposed adjacent to the second energy storage device 355. The battery pack 300 can include any number of energy storage devices 355. For example, the battery pack 300 can include four energy storage devices 355. The energy storage devices 355 can be disposed adjacent to each other. At least one other component of the battery pack 300 can be disposed between each of the energy storage devices 355.

The energy storage device 355 can be enclosed at least partially within the cover 310 and the plate 305. For example, the energy storage device 355 can be disposed in the cavity 315 defined by the cover 310 and the plate 305. The plurality of energy storage devices 355 can be arranged such that a first energy storage device 355 is disposed adjacent to the first structural member 350 and a second energy storage device 355 is disposed adjacent to the second structural member 350. The plurality of energy storage devices 355 can be disposed between the first and second structural members 350.

The battery pack 300 can include at least one wall. For example, the battery pack 300 can include a first wall, shown as left wall 360. The left wall 360 can provide structural support to the battery pack 300 and facilitate proper positioning of the energy storage device 355 within the battery pack 300. The battery pack 300 can include a second wall, shown as right wall 365. The right wall 365 can provide structural support to the battery pack 300 and facilitate proper positioning of the energy storage device 355 within the battery pack 300. The left wall 360 and the right wall 365 can be shear walls. For example, the left wall 360 and the right wall 365 can distribute forces around the energy storage device(s) 355 to protect the energy storage device(s) 355. At least one of the left wall 360 and the right wall 365 can be coupled with or integral with the energy storage device 355. For example, the energy storage device 355 can have a first device side (e.g., left device side) 370 and a second device side (e.g., right device side) 375. The first device side 370 can be coupled with or integral with the left wall 360. The second device side 375 can be coupled with or integral with the right wall 365. The walls 360, 365 can be coupled with the energy storage device 355 via any coupling mechanism. For example, the walls 360, 365 can be coupled with the energy storage device 355 via an adhesive.

The battery pack 300 can include a plurality of left walls 360 and a plurality of right walls 365. For example, the battery pack 300 can include a plurality of energy storage devices 355. The plurality of energy storage devices 355 can include a first energy storage device 355 and a second energy storage device 355. The first energy storage device 355 can be coupled with a first left wall 360 and a first right wall 365 and the second energy storage device 355 can be coupled with a second left wall 360 and a second right wall 365. The first energy storage device 355 can be disposed adjacent to the second energy storage device 355. For example, the first right wall 365 can be disposed adjacent to the second left wall 360. The first right wall 365 can be disposed spaced away from the second left wall 360. The left wall 360 can be referred to as either a first wall or second wall and the right wall 365 can be referred to as a first wall or second wall.

The cover 310 can be coupled, either directly or indirectly, with at least one of the left wall 360 and the right wall 365. The direct coupling can include a surface of the cover 310 directly interfacing with a surface of the left or right wall 360, 365. The indirect coupling can include at least one intervening component or material disposed between the cover 310 and the right or left wall 360, 365. For example, the battery pack 300 can include at least one bracket 380. The bracket 380 can couple (e.g., indirectly) the cover 310 with a left wall 360 and a right wall 365. For example, the bracket 380 can extend between the left wall 360 and the right wall 365 such that the bracket 380 can interface with the cover 310, the left wall 360, and the right wall 365. The bracket 380 can couple with the cover 310, the left wall 360, and the right wall 365 via any coupling mechanism, including for example a mechanical fastener, shown as bolt 385. For example, the bracket 380 can be coupled with the right wall 365 via a first bolt 385, coupled with the left wall 360 via a second bolt 385, and coupled with the cover 310 via a third bolt 385.

Figure 4:
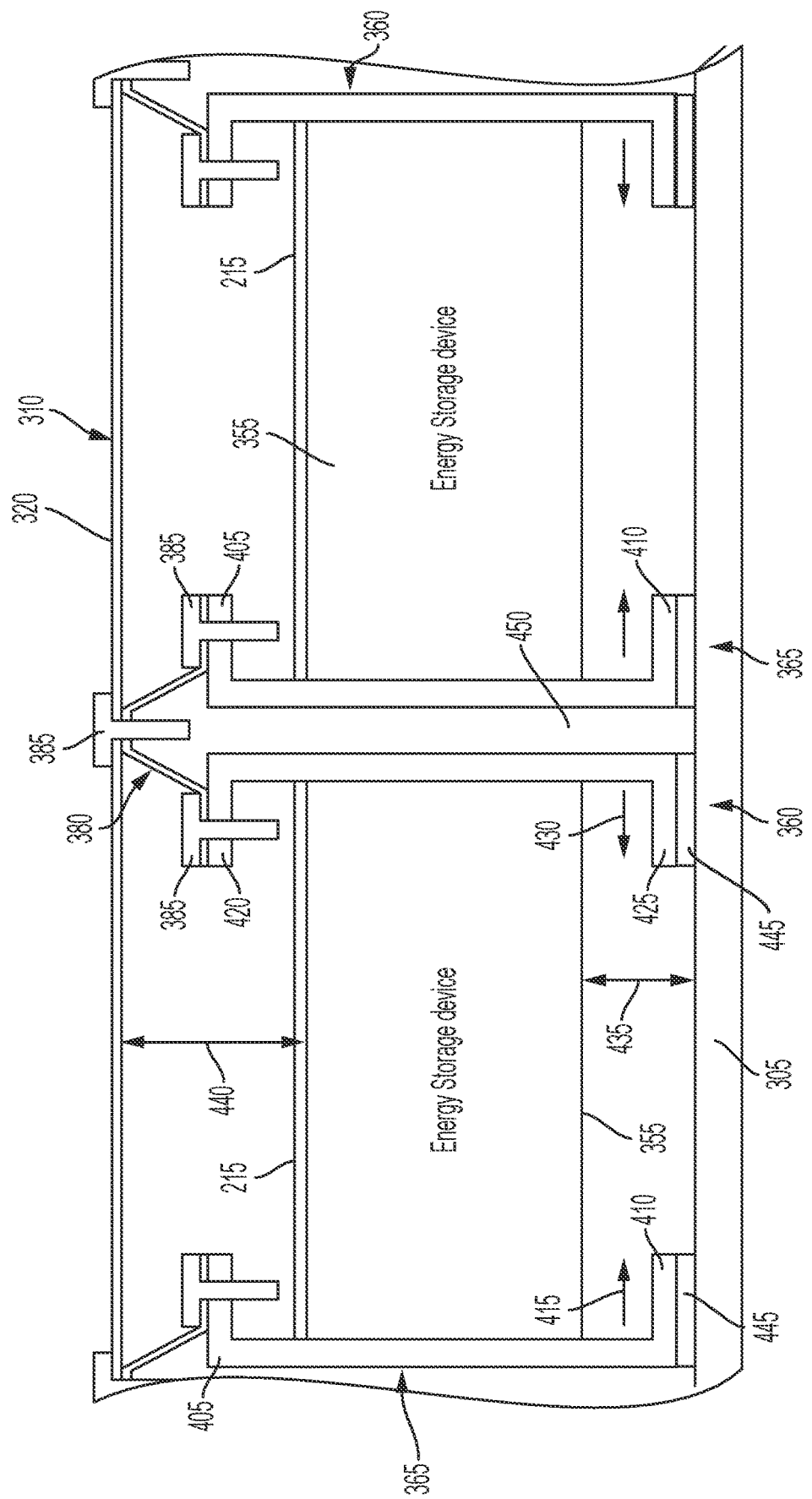
FIG. 4 depicts a front cross-sectional view of a portion of an example battery pack, in accordance with some aspects.

FIG. 4 depicts an enlarged view of a portion of the battery pack 300. An energy storage device 355 can have (e.g., be coupled with or be integral with) a left wall 360 and a right wall 365. The left wall 360 can have a left top flange 405 and a left bottom flange 410. The left top flange 405 can be disposed on a first side of the energy storage device 355 (e.g., above the energy storage device 355). The left bottom flange 410 can be disposed on a second side of the energy storage device 355 (e.g., below the energy storage device 355). The first side of the energy storage device 355 can be opposite the second side. The left top flange 405 can be disposed adjacent to the lid 320 of the cover 310. The left bottom flange 410 can be disposed adjacent to the plate 305. The left flanges 405, 410 can extend in a first direction 415 from the left wall 360. The first direction 415 can be substantially parallel (+/−10%) with at least one of the plate 305 and the lid 320 of the cover 310. The first direction 415 can be toward the energy storage device 355 to which the left wall 360 is coupled. For example, at least a portion of the left top flange 405 can be disposed above the energy storage device 355 and at least a portion of the left bottom flange 410 can be disposed below the energy storage device 355.

The right wall 365 can have a right top flange 420 and a right bottom flange 425. The right top flange 420 can be disposed on a first side of the energy storage device 355 (e.g., above the energy storage device 355). The right bottom flange 425 can be disposed on a second side of the energy storage device 355 (e.g., below the energy storage device 355). The first side of the energy storage device 355 can be opposite the second side. The right top flange 420 can be disposed on the same side of the energy storage device 355 as the left top flange 405. The right bottom flange 425 can be disposed on the same side of the energy storage device 355 as the left bottom flange 410. The right top flange 420 can be disposed adjacent to the lid 320 of the cover 310. The right bottom flange 425 can be disposed adjacent to the plate 305. The right flanges 420, 425 can extend in a second direction 430 from the right wall 365. The second direction 430 can be substantially parallel (+/−10%) with at least one of the plate 305 and the lid 320 of the cover 310. The second direction 430 can be opposite the first direction 415. The second direction 430 can be toward the energy storage device 355 to which the right wall 365 is coupled. For example, at least a portion of the right top flange 420 can be disposed above the energy storage device 355 and at least a portion of the right bottom flange 425 can be disposed below the energy storage device. The left top flange 405 of the left wall 360 can extend toward the right top flange 420 of the right wall 365 and the left bottom flange 410 of the left wall 360 can extend toward the right bottom flange 425 of the right wall 365.

The energy storage device 355 can be disposed at least partially between the left top flange 405 and the left bottom flange 410 and between the right top flange 420 and the right bottom flange 425. The energy storage device 355 can be disposed a first distance 435 away from the plate 305. For example the energy storage device 355 can be disposed above the left bottom flange 410 and the right bottom flange 425, away from the plate 305. The first distance 435 between the energy storage device 355 and the plate 305 can facilitate venting of the energy storage device 355. The first distance 435 can be, for example, approximately 10-15 mm (+/−10%). The energy storage device 355 can be disposed a second distance 440 away from the cover 310. For example, the energy storage device 355 can be disposed below the left top flange 405 and the right top flange 420. The energy storage device 355 can be disposed the second distance 440 away from the lid 320 of the cover 310. A thermal component 215 (e.g., a cold plate) can be disposed above (e.g., on top of) the energy storage device 355. The thermal component 215 can be disposed between the energy storage device 355 and the top flanges 405, 420. The second distance 440 can be the same as, less than, or greater than the first distance 435.

The left wall 360 and the right wall 365 can be coupled with the plate 305. For example, the left wall 360 can be coupled with the plate 305 via the left bottom flange 410. The right wall 365 can be coupled with the plate 305 via the right bottom flange 425. The bottom flanges 410, 425 can be coupled with the plate 305 via any fastening mechanism. For example, the bottom flanges 410, 425 can be coupled with the plate 305 via an adhesive 445. For example, the adhesive 445 can be a low viscosity acrylic adhesive. Being coupled with the plate 305 can include additional materials or components being disposed between the bottom flanges 410, 425 and the plate 305. For example, the adhesive 445 can be disposed between the bottom flanges 410, 425 and the plate 305. A sheet of material or other components can be disposed between the bottom flanges 410, 425 and the plate 305.

The battery pack 300 can include a plurality of energy storage devices 355. For example, the battery pack 300 can include a first energy storage device 355 and a second energy storage device 355. The first energy storage device 355 can have a first left wall 360 and a first right wall 365. The second energy storage device 355 can have a second left wall 360 and a second right wall 365. The first energy storage device 355 can be positioned adjacent to the second energy storage device 355. For example, the first right wall 365 can be disposed adjacent to the second left wall 360. The first right wall 365 can be spaced apart from the second left wall 360. For example, a gap 450 can exist between the first right wall 365 and the second left wall 360. The gap 450 can be, for example, approximately 15 mm (+/−10%).

The cover 310 can be coupled with at least one wall. For example, the cover 310 can be coupled with a first wall (e.g., left wall 360) and a second wall (e.g., right wall 365). For example, a right wall 365 can be disposed adjacent to a left wall 360 (e.g., the first right wall 365 of the first energy storage device 355 and the second left wall 360 of the second energy storage device 355). The cover 310 can be coupled with the right wall 365 and the left wall 360 via a coupling mechanism. The coupling mechanism can include, for example, at least one bracket 380 and at least one fastener, shown as bolt 385. The coupling mechanism can be any mechanism capable of coupling the walls 360, 365 with the cover 310 (e.g., bolt, nail, adhesive, solder, chemical bonding, among others). Being coupled with the left and right walls 360, 365 can include intervening materials or components that are disposed between the cover 310 and the walls 360, 365. The bracket 380 can couple the right wall 365 with the left wall 360. For example, the bracket 380 can extend between the right wall 365 and the left wall 360. The bracket 380 can extend between a first top flange (e.g., right top flange 420 of the right wall 365) and a second top flange (e.g., left top flange 405 of the left wall 360). The bracket 380 can be coupled (e.g., fastened) with the right wall 365 via a first bolt 385. The bracket 380 can be coupled with the left wall 360 via a second bolt 385. The cover 310 can be coupled with the bracket 380 via a third bolt 385.

Figure 5:
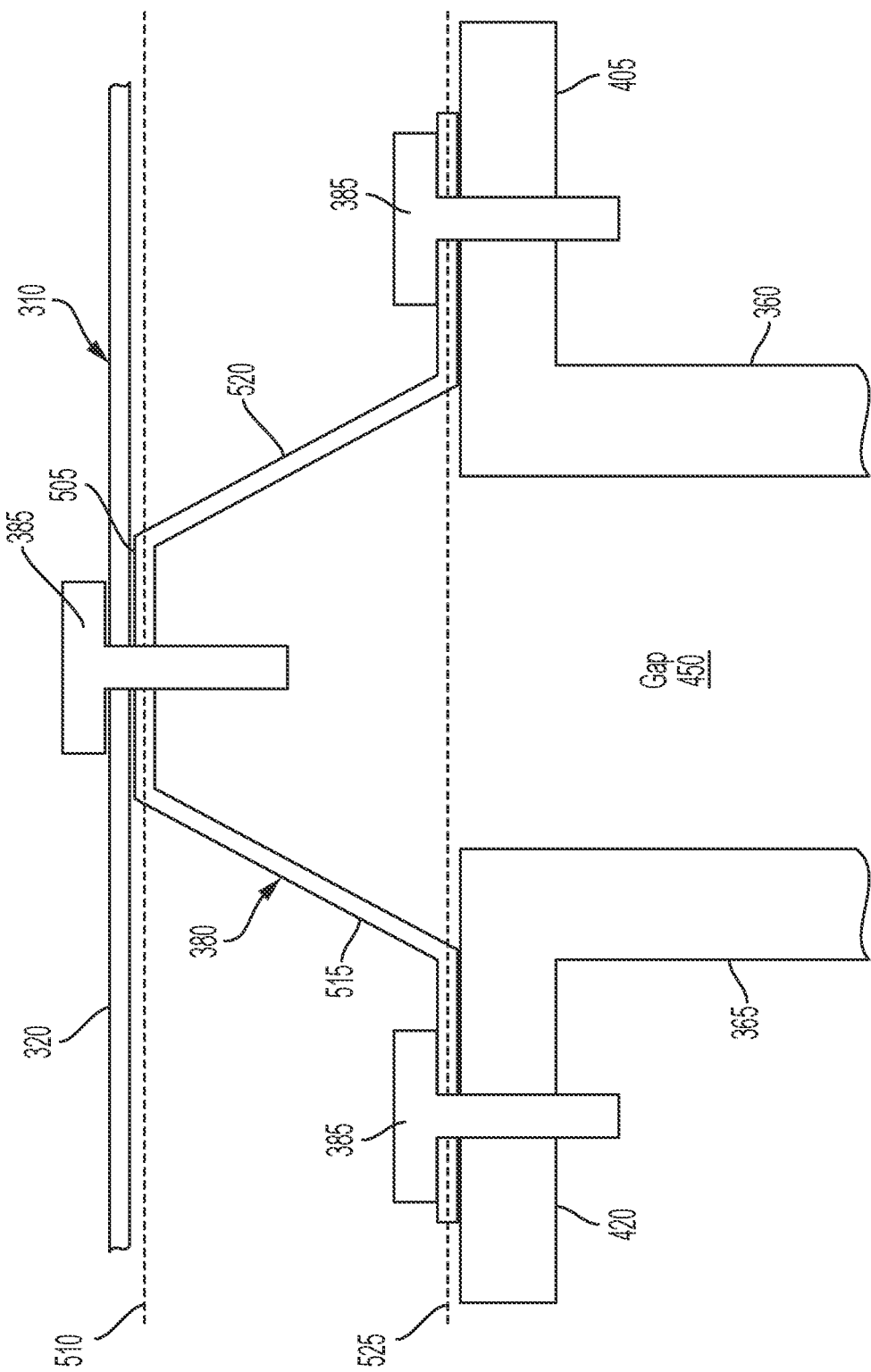
FIG. 5 depicts an enlarged front view of an example bracket, in accordance with some aspects.

FIG. 5 depicts an enlarged view of the bracket 380. The bracket 380 can include a body 505. The body 505 can be disposed at least partially in a first plane 510. The plane 510 can be substantially parallel (+/−10%) with the lid 320 of the cover 310. The bracket 380 can include at least one arm. For example, the bracket 380 can include a first bracket arm 515 and a second bracket arm 520. The first bracket arm 515 and the second bracket arm 520 can extend away from the body 505. The first bracket arm 515 can extend opposite the second bracket arm 520. The first bracket arm 515 and the second bracket arm 520 can extend toward a second plane 525. The second plane 525 can be offset from the first plane 510 and substantially parallel (+/−10%) with the first plane 510. At least a portion of the first bracket arm 515 and at least a portion of the second bracket arm 520 can be disposed in the second plane 525. The cover 310 can couple with the bracket 380 via the body 505 via, for example, a first bolt 385. The bracket 380 can be disposed such that the first bolt 385 is aligned at least partially with the gap 450 between the right wall 365 and the left wall 360. The first bracket arm 515 can couple with a first wall (e.g., a right wall 365 of a first energy storage device 355) and the second bracket arm 520 can couple with a second wall (e.g., a left wall 360 of a second energy storage device 355). The first bracket arm 515 can couple with the first wall via a first top flange (e.g., right top flange 420 of the right wall 365) via, for example, a second bolt 385. The second bracket arm 520 can couple with the second wall via a second top flange (e.g., left top flange 405 of the left wall 360) via, for example, a third bolt 385. The offset between the first plane 510 and the second plane 525 can provide a space between the cover 310 and the top flanges 405, 420.

Figure 6:
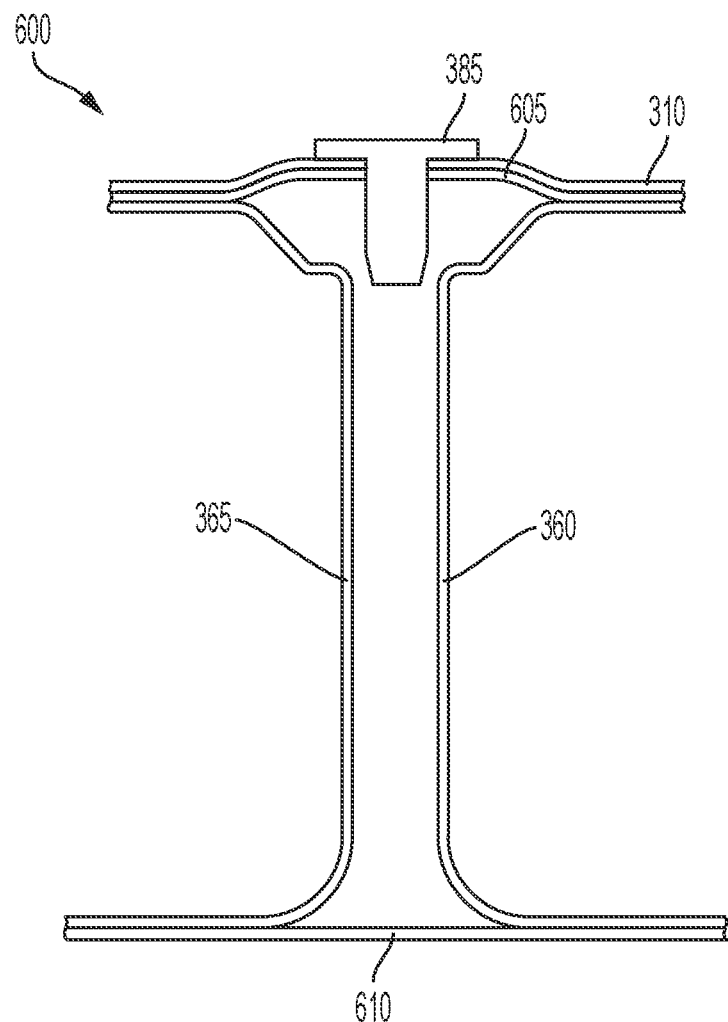
FIG. 6 depicts a front cross-sectional view of an example wall structure, in accordance with some aspects.

FIG. 6 depicts a front cross-sectional view of an example wall structure 600. The wall structure 600 can include a left wall 360 and a right wall 365. The left wall 360 and the right wall 365 can be integrally formed to form a single structure. For example, the wall structure 600 can include a top plate 605. The top plate 605 can be disposed adjacent to, and interface with at least a portion of the cover 310. The top plate 605 can extend between, and be integral with, the left wall 360 and the right wall 365 such that the top plate 605, the left wall 360, and the right wall 365 form a single component. The top plate 605 can replace the bracket 380. For example, the cover 310 can couple with the wall structure 600 (e.g., the left and right walls 360, 365) via the top plate 605. For example, the cover 310 can couple with the top plate 605 via a bolt 385. The wall structure 600 can couple with the cover 310 at a location via a single bolt 385 rather than requiring more than one bolt 385 (e.g., three bolts 385) like with the bracket 380. Using fewer bolts 385 to couple the cover 310 with the wall structure 600 can increase the speed and efficiency of installing the energy storage devices 355 in the battery pack 300.

The wall structure 600 can include a base plate 610. The base plate 610 can be disposed adjacent to, and interface with at least a portion of the plate 305. The base plate 610 can extend between, and be integral with, the left wall 360 and the right wall 365 such that the base plate 610, the left wall 360, and the right wall 365 form a single component. The base plate 610, the left wall 360, the right wall 365, and the top plate 605 can form a single component. The base plate 610 can replace the bottom flanges 410, 425. For example, the plate 305 can couple with the wall structure 600 (e.g., the left and right walls 360, 365) via the base plate 610. For example, the plate 305 can couple with the base plate 610 via an adhesive. The wall structure 600 can have any shape. For example, the wall structure 600 can have a shape similar to an I-beam.

Figure 7:
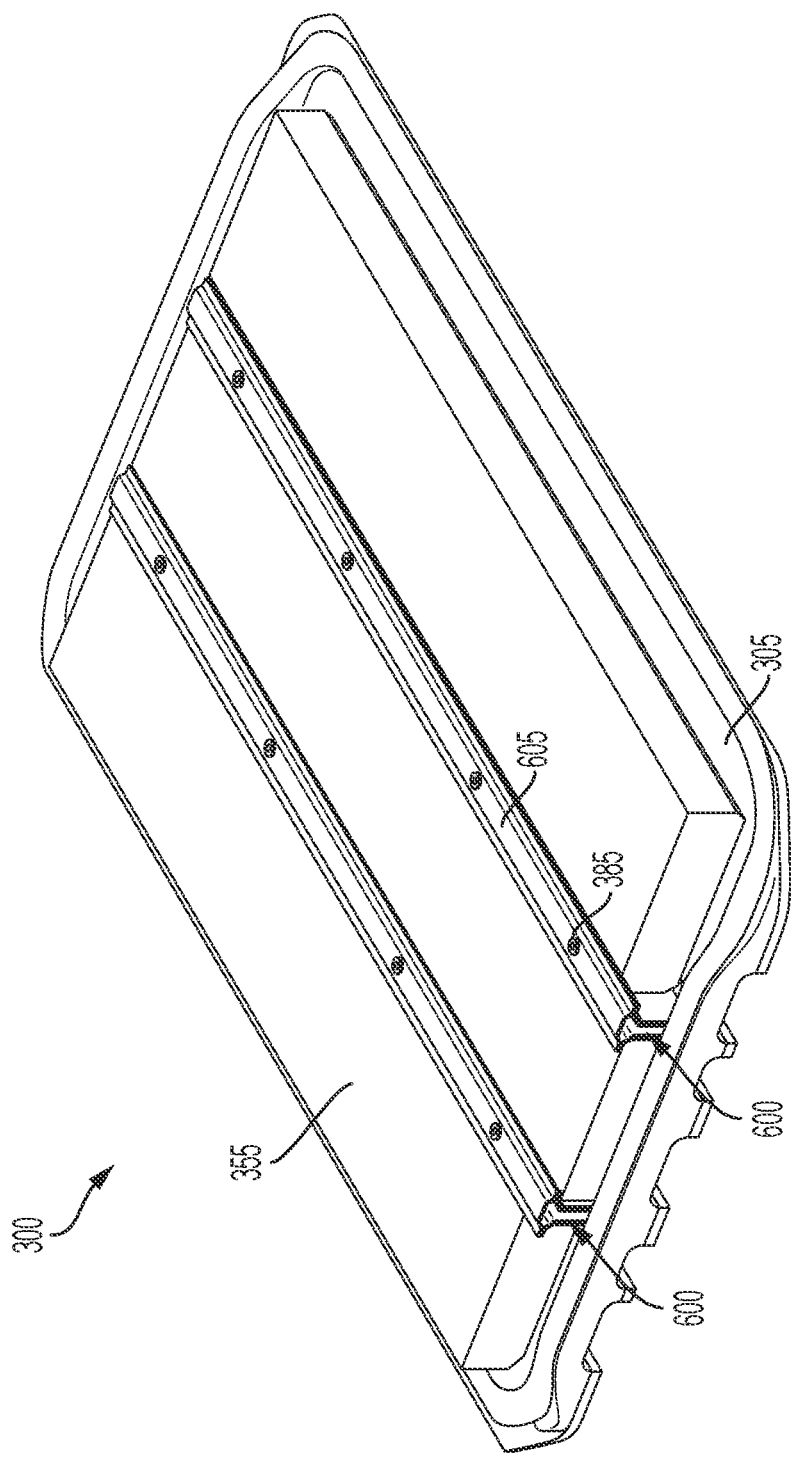
FIG. 7 depicts a top perspective view of an example battery pack, in accordance with some aspects.
Figure 8:
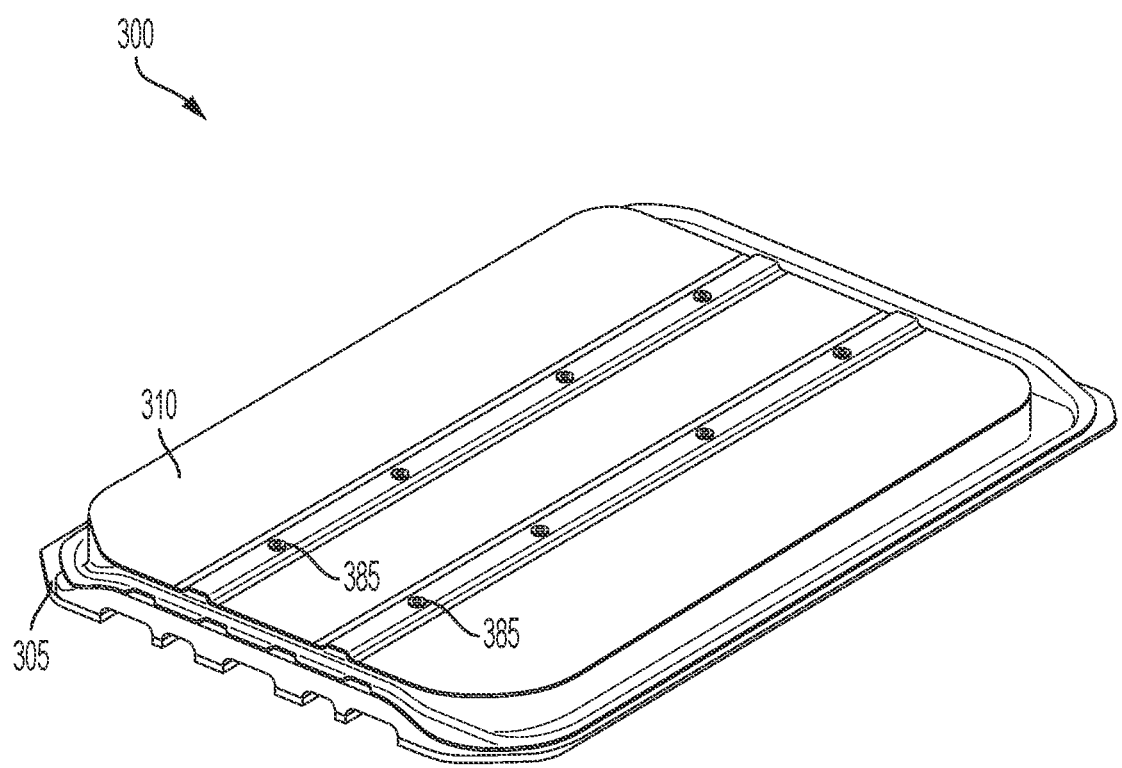
FIG. 8 depicts a top perspective view of an example battery pack, in accordance with some aspects.

FIGS. 7 and 8 depict top perspective views of the battery pack 300. The battery pack 300 can include a plurality of energy storage devices 355. For example, as shown in FIG. 7, among others, the battery pack 300 can include three energy storage devices 355. The battery pack 300 can include more or less than three energy storage devices 355. The energy storage devices 355 can extend approximately (+/−10%) a full length of the battery pack 300. The plurality of energy storage devices 355 can be separated by at least one wall. For example, energy storage devices 355 can be separated by at least one of a left wall 360 and a right wall 365 that are coupled together via a bracket 380 and a wall structure 600 wherein the left wall 360 and the right wall 365 are integrally formed.

The wall structure 600 can extend the full length (+/−10%) of the energy storage devices 355. The cover 310 can be coupled with the wall structure 600 at various locations. For example, the cover 310 can be coupled with the wall structure at approximately (+/−20%) ever half meter (e.g., 500 mm). A bolt 385 can couple the wall structure 600 with the cover 310 at each of the locations.

The left wall 360 and the right wall 365 that can be coupled together and with the cover 310 via a bracket 380 can extend the full length (+/−10%) of the energy storage devices 355. The cover 310 can be coupled with the left wall 360 and the right wall 365 at various locations. For example, a plurality of brackets 380 can be disposed along the left wall 360 and the right wall 365 at various locations. The brackets 380 can be equally spaced apart. For example, a bracket 380 can be placed at approximately (+/−20%) ever half meter (e.g., 500 mm).

The battery pack 300 can be a part of an electric vehicle 105. For example, the battery pack 300 of the electric vehicle 105 can include an energy storage device 355. The battery pack 300 can include a first wall (e.g., left wall 360). The first wall can be coupled with the energy storage device 355. The battery pack 300 can include a second wall (e.g., right wall 365). The second wall can be disposed adjacent to and spaced apart from the first wall. The battery pack 300 can include a bracket 380. The bracket 380 can extend between the first wall and the second wall. The bracket 380 can couple the first wall with the second wall. For example, the bracket 380 can be coupled with the first wall via a first mechanical fastener (e.g., a first bolt 385). The bracket 380 can be coupled with the second wall via a second mechanical fastener (e.g., a second bolt 385). The battery pack 300 can include a cover 310. The cover 310 can be coupled with the first wall and the second wall via the bracket 380. For example, the cover 310 can be coupled with the bracket 380 via a third mechanical fastener (e.g., a third bolt 385). The battery pack 300 can include a plate 305. The plate 305 can be coupled with the first wall and the second wall. For example, the plate 305 can be coupled with the first wall and the second wall via an adhesive 445. The plate 305 and the cover 310 can define a cavity 315. The energy storage device 355 can be disposed in the cavity 315.

The battery pack 300 can include a plurality of energy storage devices 355. For example, the battery pack 300 can include a first energy storage device 355 and a second energy storage device 355. The first wall can be coupled with the first energy storage device 355 and the second wall can be couple with the second energy storage device 355.

The battery pack 300 can include a plurality of brackets 380. For example, the battery pack 300 can include a first bracket 380 and a second bracket 380. The energy storage device 355 can be coupled with a first wall and a third wall. The first wall can be coupled with a first device side 370 and the third wall can be coupled with a second device side 375. The first bracket 380 can couple the cover 310 with the first wall (and the second wall) and the second bracket 380 can couple the cover 310 with the third wall.

Figure 9:
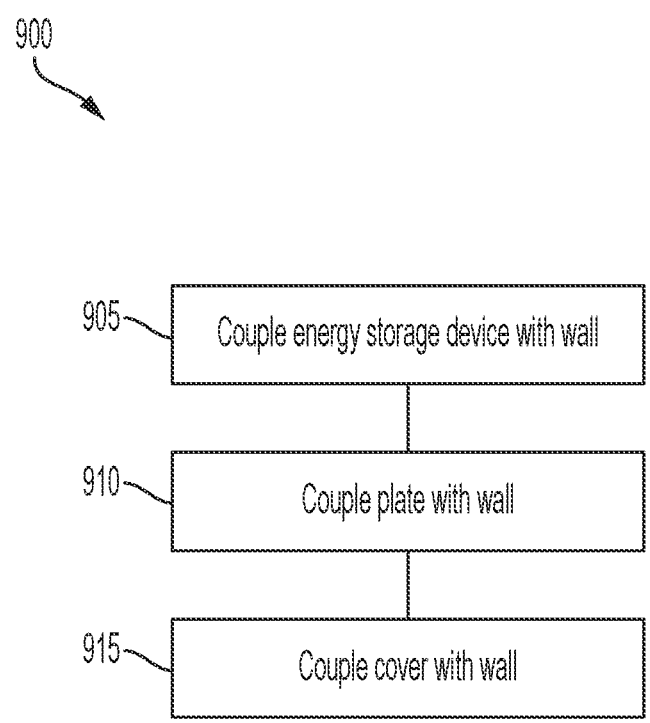
FIG. 9 depicts a flow diagram illustrating an example method to assemble a battery pack, in accordance with some aspects.

FIG. 9 depicts an example method 900 of assembling a battery pack 300. The method 900 can include coupling an energy storage device 355 with a wall (e.g., left wall 360, right wall 365, wall structure 600) (Act 905), coupling a plate 305 with the wall (Act 910), and coupling a cover 310 with the wall (Act 915).

Act 905 of coupling an energy storage device 355 with a wall can include coupling an energy storage device 355 with at least one of a left wall 360 and a right wall 365. For example, a side of the energy storage device 355 can couple with the left wall 360. The energy storage device 355 can be coupled with the left wall 360 via an adhesive. The left wall 360 can include a left top flange 405 and a left bottom flange 410. The energy storage device 355 can be disposed at least partially between a left top flange 405 and a left bottom flange 410.

Act 905 can include coupling an energy storage device 355 with a first wall and a second wall. For example, the energy storage device 355 can have a first device side 370 and a second device side 375 opposite the first device side 370. The first wall can be the left wall 360 and the second wall can be a right wall 365. The first device side 370 can couple with the right wall 365 and the second device side 375 can couple with the left wall 360.

Act 905 can include coupling a first energy storage device 355 with a first wall and a second energy storage device 355 with a second wall. For example, the first energy storage device 355 can couple with the right wall 365 and the second energy storage device 355 can couple with the left wall 360. The right wall 365 can be disposed adjacent to and spaced apart from the left wall 360. Each energy storage device 355 can be coupled with a left wall 360 and a right wall 365.

Act 910 of coupling a plate 305 with a wall can include coupling the plate 305 with at least one of the left wall 360 and the right wall 365. For example, the left bottom flange 410 of the left wall 360 can couple with the plate 305. The left wall 360 can couple with the plate 305 via an adhesive (e.g., adhesive 445).

Act 910 can include coupling a plurality of walls with the plate 305. For example, an energy storage device 355 can couple with a left wall 360 and a right wall 365. The left bottom flange 410 of the left wall 360 can couple with the plate 305 and the right bottom flange 425 can couple with the plate 305. A first energy storage device 355 can couple with a right wall 365 and a second energy storage device 355 can couple with a left wall 360. The right wall 365 and the left wall 360 can couple with the plate 305.

Act 915 of coupling a cover 310 with a wall can include coupling the cover 310 with at least one of the left wall 360 and the right wall 365. For example, the left top flange 405 of the left wall 360 can couple with the cover 310. The cover 310 can couple with the left wall 360 via a bracket 380. For example, the cover 310 can couple with the bracket 380 via a first bolt 385. The bracket can couple with the left wall 360 via a second bolt 385.

Act 915 can include coupling a plurality of walls with the cover 310. For example, an energy storage device 355 can couple with a left wall 360 and a right wall 365. The left top flange 405 of the left wall 360 can couple with the cover 310 and the right top flange 420 can couple with the cover 310. The left wall 360 can couple with the cover 310 via a first bracket 380 and the right wall 365 can couple with the cover 310 via a second bracket 380.

A first energy storage device 355 can couple with a right wall 365 and a second energy storage device 355 can couple with a left wall 360. The right wall 365 and the left wall 360 can couple with the cover 310. For example, Act 915 can include coupling the left wall 360 with the right wall 365 via a bracket 380. The bracket 380 can couple with a left top flange 405 of the left wall 360 and a right top flange 420 of the right wall 365. The cover 310 can couple with the bracket 380, which can couple the cover 310 with the left wall 360 and the right wall 365.

The above examples refer generally to the separate left wall 360 and right wall 365. The same method 900 can be applied with a wall structure 600. For example, coupling an energy storage device 355 with a wall at Act 905 can include coupling an energy storage device 355 with at least one of the left wall 360 and the right wall 365 of the wall structure 600. Coupling an energy storage device 355 with a first wall and a second wall can include coupling the energy storage device 355 with a right wall 365 of a first wall structure 600 and a left wall 360 of a second wall structure 600. A first energy storage device 355 can be coupled with a left wall 360 of a first wall structure 600 and a second energy storage device 355 can be coupled with a right wall 365 of a second wall structure 600.

At Act 910, the plate 305 can couple with at least one wall structure 600. For example, the plate 305 can couple with the base plate 610 of a wall structure 600. The plate 305 can couple with the base plate 610 via an adhesive. The plate 305 can couple with a plurality of wall structures 600.

At Act 915, the cover 310 can couple with at least one wall structure 600. For example, the cover 310 can couple with the top plate 605 of a wall structure 600. The cover 310 can couple with the top plate 605 at a first location via a single bolt 385. The cover 310 can couple with a plurality of wall structures 600.

Figure 10:
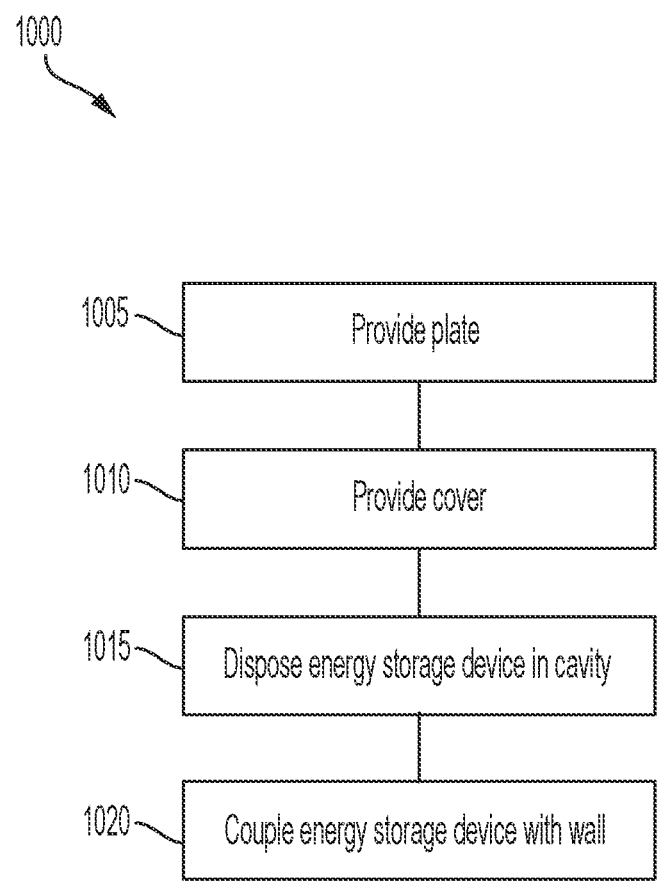
FIG. 10 depicts a flow diagram illustrating an example method to assemble a battery pack, in accordance with some aspects.

FIG. 10 depicts an example method 1000 of assembling a battery pack 300. The method 1000 can include providing a plate 305 (Act 1005), providing a cover 310 (Act 1010), disposing an energy storage device 355 in a cavity 315 defined by the cover 310 and the plate 305 (Act 1015), and coupling the energy storage device 355 with a wall (e.g., left wall 360, right wall 365, wall structure 600) in the cavity 315 (Act 1020). Acts 1005-1020 can include similar steps and features as described with respect to method 900.

At act 1005, providing a plate 305 can include manufacturing at least one plate 305. Manufacturing the plate 305 can include configuring the plate 305 to couple with at least one wall 360, 365. For example, manufacturing the plate 305 can include creating a component that is at least partially flat to couple with the at least one wall 360, 365.

At act 1010, providing a cover 310 can include manufacturing at least one cover 310. Manufacturing the cover 310 can include configuring the cover 310 to couple with the plate 305. For example, manufacturing the cover 310 can include creating a component with at least one of a first projection 335 and a second projection 340 to couple with the plate 305. Manufacturing the cover 310 can include configuring the cover 310 such that the cover 310 and the base 305 can define a cavity 315. For example, the cover 310 can have a lid 320. The lid 320 can be disposed away from and opposite of the plate 305. The cover can have a first sidewall 325 and a second sidewall 330. The first sidewall 325 can be opposite the second sidewall 330. The first sidewall 325 and the second sidewall 330 can extend from the lid 320 toward the plate 305 such that there is a gap or space between the lid 320 and the plate 305. Act 1010 can include coupling the cover 310 with the plate 305. For example, act 1010 can include coupling the cover 310 with the plate 305 via a mechanical fastener (e.g. a bolt).

At act 1015, disposing the energy storage device 355 in the cavity 315 can include disposing at least a portion of the energy storage device 355 in the cavity. Act 1015 can include at least partially enclosing the energy storage device 355 in the cavity 315. Act 1015 can include disposing at least one wall 360, 365 at least partially in the cavity 315.

At act 1020, coupling the energy storage device 355 with a wall can include coupling the energy storage device 355 with at least one of a left wall 360 and a right wall 365. For example, act 1020 can include adhering the energy storage device 355 with the wall 360, 365 via an adhesive.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of left and right, top and bottom, etc. may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Coupled elements can, for example, be connected with one another in any manner including, but not limited to being interconnected, fastened, attached, secured, adhered, affixed, hooked, hitched, joined, or united. Scope of the systems and methods described herein is thus indicated by the appended claims, rather than the foregoing description, and changes that come within the meaning and range of equivalency of the claims are embraced therein.

What is claimed is:

1. An apparatus, comprising:
a first wall coupled with a first energy storage device;
a second wall coupled with a second energy storage device, the first wall separate from and spaced apart from the second wall;
a cover coupled with the first wall and the second wall via a bracket;
a plate coupled with the first wall and the second wall, the first energy storage device and the second energy storage device enclosed at least partially by the cover and the plate; and
the first wall comprising a top flange and a bottom flange, the top flange coupled with the cover via a mechanical fastener and the bottom flange coupled with the plate via an adhesive.

2. The apparatus of claim 1, comprising:
a third wall;
the first wall coupled with a first side of the first energy storage device and the third wall coupled with a second side of the first energy storage device;
the cover fastened to the first wall via a first mechanical fastener and the third wall via a second mechanical fastener; and
the plate affixed to the first wall and the third wall via an adhesive.

3. The apparatus of claim 1, comprising:
the first wall comprising a first top flange and a first bottom flange;
the second wall comprising a second top flange and a second bottom flange;
the bracket extending between the first top flange and the second top flange to couple the first wall with the second wall;
the cover secured to the first wall and the second wall via the bracket; and
the plate coupled with the first bottom flange and the second bottom flange.

4. The apparatus of claim 1, wherein the top flange of the first wall is a first top flange, the apparatus comprising:
the second wall comprising a second top flange;
the bracket comprising a body, a first bracket arm extending away from the body, and a second bracket arm extending away from the body, the first bracket arm attaches to the first top flange, the second bracket arm attaches to the second top flange, and the body attaches to the cover, at least a portion of the first bracket arm and at least a portion of the second bracket arm disposed in a first plane and at least a portion of the body disposed in a second plane, the first plane offset from and substantially parallel with the second plane; and
the cover to couple with the bracket via the body.

5. The apparatus of claim 1, wherein the top flange of the first wall is a first top flange and the bottom flange of the first wall is a first bottom flange, the apparatus comprising:
the second wall comprising a second top flange and a second bottom flange, the first wall disposed adjacent to the second wall;
the first top flange extending away from the first wall in a first direction, the first direction being away from the second wall, the second top flange extending away from the second wall in a second direction, the second direction being away from the first wall, the first bottom flange extending away from the first wall in the first direction, and the second bottom flange extending away from the second wall in the second direction.

6. The apparatus of claim 1, comprising:
the first wall and the second wall create a wall structure, the wall structure comprising a base plate, the plate coupled with the base plate.

7. The apparatus of claim 1, comprising:
a space between the first wall and the second wall, the space having a width of at least 10 mm.

8. The apparatus of claim 1, comprising:
the first and second energy storage devices disposed a first distance from the plate, the first distance to facilitate venting of the first and second energy storage devices; and
the first wall disposed a second distance from the second wall, the second distance to provide impact protection to the first and second energy storage devices.

9. A method, comprising:
providing a plate;
providing a cover, the plate and the cover to define a cavity;
disposing a first energy storage device and a second energy storage device in the cavity;
coupling the first energy storage device with a first wall in the cavity, the first wall comprising a top flange and a bottom flange;
coupling the second energy storage device with a second wall in the cavity; and
coupling the cover with the first wall and the second wall via a bracket, wherein the top flange of the first wall is coupled with the cover via a mechanical fastener; and
adhering the bottom flange with the plate via an adhesive.

10. The method of claim 9, comprising:
coupling the first wall with a first side of the first energy storage device;
coupling a third wall with a second side of the first energy storage device, the first side opposite the second side; and
coupling the third wall with the cover and the plate.

11. The method of claim 9, wherein the top flange of the first wall is a first top flange and the bottom flange of the first wall is a first bottom flange, wherein the second wall includes a second top flange and a second bottom flange, wherein the bracket is coupled with the first top flange and the second top flange the method comprising:

coupling the cover with the bracket; and coupling the plate with the first bottom flange and the second bottom flange.

12. The method of claim 9, comprising:

providing a wall structure comprising the first wall and the second wall, the wall structure comprising a bottom plate; and coupling the plate with the bottom plate of the wall structure.

13. An electric vehicle, comprising:

a battery pack, comprising:

a first wall coupled with a first energy storage device, the first wall comprising a top flange and a bottom flange;

a second wall disposed adjacent to and separate from the first wall, the second wall coupled with a second energy storage device; and a bracket to couple the first wall with the second wall, the bracket coupled with the first wall via a first mechanical fastener and the bracket coupled with the second wall via a second mechanical fastener;

a cover coupled with the top flange of the first wall and the second wall via the bracket, the cover coupled with the bracket via a third mechanical fastener; and a plate coupled with the bottom flange of the first wall and the second wall, the plate and the cover defining a cavity, the first energy storage device and the second energy storage device disposed in the cavity;

wherein the bottom flange of the first wall is coupled with the plate via an adhesive.

14. The electric vehicle of claim 13, comprising:

the plate coupled with the second wall via an adhesive.

15. The electric vehicle of claim 13, wherein the bracket is a first bracket, the electric vehicle comprising:

a third wall, the first wall coupled with a first side of the first energy storage device and the third wall coupled with a second side of the first energy storage device; and a second bracket, the cover coupled with the third wall via the second bracket.

\* \* \* \* \*